US008185514B1

(12) United States Patent
Skrenta

(10) Patent No.: US 8,185,514 B1
(45) Date of Patent: May 22, 2012

(54) USER-INTERFACE FEATURE AND TECHNIQUE FOR PROVIDING USERS OF A NETWORK SITE LINKS THAT HAVE BEEN DETERMINED TO BE OF INTEREST TO THE USER

(75) Inventor: Richard Skrenta, San Carlos, CA (US)

(73) Assignee: Topix LLC, Palo Alto, CA (US)

( * ) Notice: Subject to any disclaimer, the term of this patent is extended or adjusted under 35 U.S.C. 154(b) by 0 days.

(21) Appl. No.: 12/435,383

(22) Filed: May 4, 2009

Related U.S. Application Data

(63) Continuation of application No. 11/281,185, filed on Nov. 15, 2005.

(60) Provisional application No. 60/628,712, filed on Nov. 16, 2004.

(51) Int. Cl.
*G06F 7/00* (2006.01)
(52) U.S. Cl. .......................... 707/708; 707/738; 715/273
(58) Field of Classification Search .................... 707/708
See application file for complete search history.

(56) References Cited

U.S. PATENT DOCUMENTS

| 6,681,229 B1 * | 1/2004 | Cason et al. ......................... 1/1 |
| 2005/0071328 A1 * | 3/2005 | Lawrence ......................... 707/3 |
| 2005/0097188 A1 | 5/2005 | Fish |

OTHER PUBLICATIONS

U.S. Appl. No. 11/281,185, filed Nov. 15, 2005, Skrenta, R.
Final Office Action mailed Jun. 25, 2008 in U.S. Appl. No. 11/281,185, 25 pages.
Non-Final Office Action mailed Oct. 31, 2007 in U.S. Appl. No. 11/281,185, 17 pages.
Non-Final Office Action mailed Sep. 17, 2008 in U.S. Appl. No. 11/281,185, 17 pages.
Final Office Action mailed Jun. 10, 2009 in U.S. Application No. 11/281,185, 22 pages.

* cited by examiner

*Primary Examiner* — Fazlul Quader
(74) *Attorney, Agent, or Firm* — Mahamedi Paradice Kreisman LLP

(57) ABSTRACT

A visitor of a network site is provided information about previously viewed content from that site. One or more internal pages of the network site that the user selects to view during one or more visits to the network site is recorded. At least one of the one or more internal pages is associated with a heading or category that is displayed on the network site. A user-activity is detected corresponding to the visitor directing attention to the heading or category. In response, a dynamic display is generated that provides a link to the at least one internal page that is associated with the category or heading.

23 Claims, 5 Drawing Sheets

USER-INTERFACE FEATURE AND TECHNIQUE FOR PROVIDING USERS OF A NETWORK SITE LINKS THAT HAVE BEEN DETERMINED TO BE OF INTEREST TO THE USER

RELATED APPLICATIONS

This application is a continuation of U.S. patent application Ser. No. 11/281,185 filed Nov. 15, 2005 which claims benefit of priority to U.S. Provisional Application No. 60/628,712, filed Nov. 16, 2004; the aforementioned priority applications being hereby incorporated by reference in their entirety for all purposes.

TECHNICAL FIELD

The disclosed embodiments relate generally to the field of networks. In particular, the disclosed embodiments relate to a user-interface feature and technique for providing individual users of a network site links that have been determined to be of interest to the user.

BACKGROUND

Portals, search engines and other network sites often display selectable menus, tabs and subject headings that visitors can select in order to view pages that are made available through that site. The internal pages of a network site may be sorted by the menus, tabs and subject headings, with internal pages containing additional features for selecting other pages. In addition, many sites provide a search feature, where a user can perform an internal search of a network site in order to locate a particular page or content item.

Typically, when network users are interested in recording the location of a network site of interest, the user copies the uniform resource locator (URL) or "bookmarks" the URL using his web browser.

DETAILED DESCRIPTION

Overview

Figure 1:
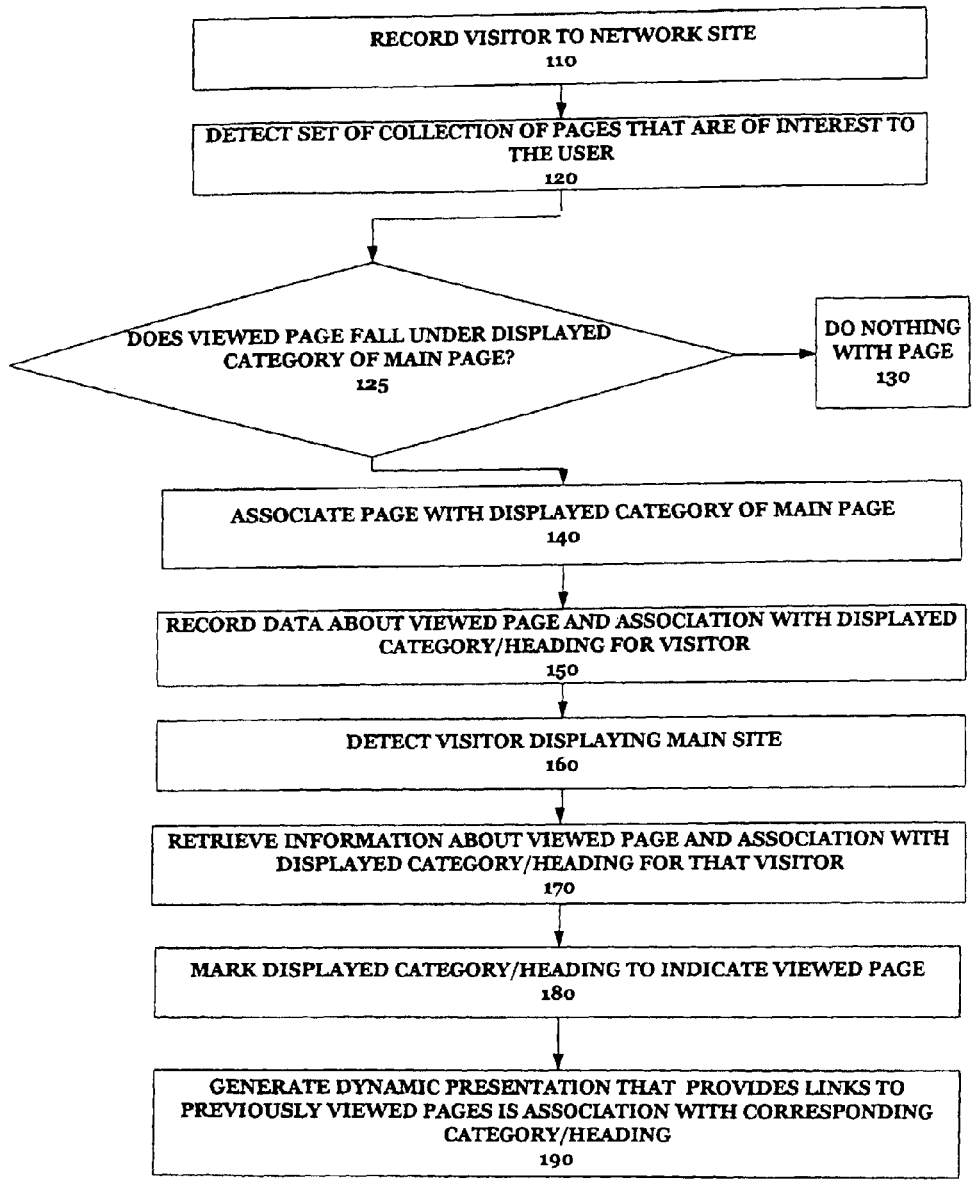
FIG. 1 illustrates a method for generating a dynamic feature to present network sites of interest to a visitor of a given network site, under an embodiment of the invention.

Embodiments of the invention provide for a user-interface feature and method, technique and system for offering visitors of a network site links to other sites that may be of interest. The links offered may be determined to be of interest to the particular visitor. In one embodiment, the links that are determined to be of interest to the user may be provided in a dynamic, user-interface feature. This feature may be hidden and/or intermittent, and activated or triggered in response to the user performing some designated action. Furthermore, the links that are determined to be of interest may be sorted on a particular page, to appear as part of a category or heading that already exists on a main page. In one embodiment, the designated action to generate the dynamic feature may be tied to the category or heading that is associated with the dynamic feature. These and other embodiments are described below.

Embodiments of the invention include a user-interface, method, system, and technique for providing one or more links of interest to a visitor of a network site. In an embodiment, the navigation actions of the user may be observed when the user opens a main page. Subsequently, one or more links of interest may be determined based on the one or more navigation actions of the user. The one or more links of interest may be associated with one of a plurality of headings on the main page. Then, a user-activity that indicates the visitor's attention is directed to the one heading is detected. In response to detecting the user-activity, a dynamic feature is generated that provides the one or more links of interest.

Pages on which embodiments of the invention may be provided may include dynamic or static pages. Furthermore, sites and network locations where embodiments are provided may include static pages or page portions that are persistent through some or all locations available through a particular site, while other portions of pages provided at such sites may be dynamic in nature or at least different from one internal location of the site to the next.

One or more embodiments described herein may be implemented through the use of modules. A module refers to a program, a subroutine, a portion of a program, a software component, firmware or a hardware component capable of performing a stated task or function. A module can exist on a hardware component such as a server independently of other modules, or a module can exist with other modules on the same server or client terminal, or within the same program. A module may be implemented on a client or on a server, or distributed between clients, servers, or amongst a client-server.

Furthermore, one or more embodiments described herein may be implemented through the use of instructions that are executable by one or more processors. These instructions may be carried on a computer-readable medium. Services and components illustrated by figures in this application provide examples of processing resources and computer-readable mediums on which instructions for implementing embodiments of the invention can be carried and/or executed. In particular, the numerous machines shown with embodiments of the invention include processor(s) and various forms of memory for holing data and instructions. Examples of computer-readable mediums include permanent memory storage devices, such as hard drives on personal computers or servers. Other examples of computer storage mediums include portable storage units, such as CD or DVD units, flash memory (such as carried on many cell phones and PDAs), and magnetic memory. A computer-readable medium as used herein may extend across multiple machines. For example, the medium may be distributed between client and server in order to perform a stated task or operation.

Methodology

FIG. 1 illustrates a method for providing a visitor of a network site information about other network sites and pages that may be of interest to the user. The other network sites of interest may correspond to network sites that the user has previously viewed or searched for. Alternatively, the network sites of interest may correspond to sites that have been determined to be of interest to the user, based on factors such as past browsing activities of the user, a profile of the user, or other online activities of the user. A context for a method such as described is a home page or main page of website having categories, headings, topics or other grouping of pages that can be accessed through a link provided on the home site. A method such as described can be implemented on any page provided by a site that includes links to other sites. For purpose of discussion, such a site is termed a main page, and the links are assumed to be under category, topic or other headings. One implementation for an embodiment includes a news site having numerous news categories, such as Headlines, Sports, Business etc. Another implementation for an embodiment includes a portal site, having numerous categories, such as Shopping, Yellow Pages, News etc. From each such category, features can be provided to enable a user to quickly navigate to other pages or sites, including those pages that are internal to the network site that is currently rendered for the user.

In step 110, a user's initial visit to the network site is recorded. When any user accesses a page of the network site, the site's server may seek an identifier that indicates the user has stored information about his previous network activity on the site's server. If an identifier is found for the user, the user is considered known. If no identifier is determined, the site's server may treat the user as a first time visitor. A page downloaded by the user may include a cookie or other form of programming logic as an identifier. This process of providing the user with an initial identifier may be performed when a visitor accesses a home page provided at the network site. Alternatively, the visitor's direct access to an internal page of the home site may be recorded. For example, the user may link to an internal page of the network site from a third site, or by entering the full uniform resource locator (URL) of the internal site in a browser. Other processes for identifying a user exist. For example, a user may be required to identify themselves by password and/or login when accessing a network site.

Step 120 provides that for a known user, individual pages or sets of pages that are deemed to be of interest to the user are recorded. In one embodiment, the pages of interest are based on user-activity. For example, browsing and navigation actions performed by the user may identify, or at least indicate, a set or collection of pages that are of interest to the user. Examples of the browsing or navigation activities include a series of navigation actions made by the user in selecting a category from a main page, then one or more sub-category selections on successive pages, resulting the user navigating to a particular page. As another example, a collection of pages associated and made available through a link of a main page may be identified together as being a set or collection of pages that are of interest to the user, based on the user's action in selecting a link to that collection of pages. It is possible for the user to perform a series of navigation actions before the collection or set of pages of interest are identified. For example, the user may start out on a home page, select a heading to an internal main page, then select a category under the internal main page that takes the user to a third page on which links to a collection of pages are provided. In this scenario, it is possible for either one or both of the first selection to the internal main page and the second selection to the third page to be used as identifiers for one or two distinct sets of pages of interest to the user.

One implementation contemplates a three-tier hierarchy, in which there is a main page, a plurality of categories links that are provided on the main page, and different sets of pages (sub-category) that belong to each category. When the user selects a category link from the main page, a category main page is rendered to the user. When the user selects a subcategory from a category main page, the pages in the subcategory are what is recorded by this step. As an alternative or additional implementation, the site may include a search feature for receiving user-search requests. In response to receiving a search request, the network site may return a search result, on which there are one or more matching results. In one embodiment, the search result corresponds to a sub-category, and what is recorded is the identification of the sub-category by the search result. In another embodiment, the search result returns more than one sub-category as a result. The user may need to make a further selection, at which time the selected sub-category marks the pages of interest for use with this step.

In step 125, a determination is made as to whether a collection or set of pages identified in step 120 are associated with a category or heading on the page where an embodiment of the invention is to be implemented. For example, an embodiment such as described herein may be implemented on a home page having a three-tier hierarchy for listing categories and providing pages associated with individual categories. The determination in step 125 may be whether the set of pages identified in step 120 are a sub-category of a category on the home page. For example, the user's past navigation actions may record the user's interest in the sport of football, or in a particular professional football team. Either set of pages (Football and/or Football team) may be recorded in step 120, and in step 125, the determination may be that the set of pages may fall under the category of Sports on the home page.

If the determination in step 125 is that there is no association between the pages of interest and a category or heading of a main page, then step 130 provides that the pages of interest are ignored, at least for the particular page being configured according to an embodiment. Otherwise, step 140 provides that for the known user, an association is made between the set or collection of pages identified in step 120 and one or more of a category or heading provided on the main page where user-interface features of an embodiment are to be provided. The association between the identified set of pages of interest and one or more categories/headings may be based on an existing association between the set/collection of pages and the one or more categories. For example, the server hosting the network site may maintain a directory structure that associates a page of a sports team with a particular sport and with the category of Sports under the home page.

In step 150, data is recorded about (i) the identification of the visitor to the network site (ii) the collection or set of pages that have been determined to be of interest to the visitor, and (iii) the association between the set/collection of pages of interest and a heading or category appearing on one or more pages that are available from the site. The data about the location of the viewed page may correspond to a URL, or data for generating or selecting a URL of the viewed page and or its update. The data about the association between the viewed page and the category/sub-category may be metadata. The identification of the user may be cookie information, a login/password identification, or other form of identification.

Once the identification of the user, the collection or set of pages that are of interest to the user, and the association between the pages of interest and the category/headings of a main page are recorded, the remainder of the method is performed when the user subsequently downloads the main page (where user-interface features under an embodiment are implemented). In step 160, the identification of the user is determined when the user downloads the main or home page on which the user-interface features of an embodiment are to be provided. For example, a hosting server may receive cookie information, which it uses to identify the visitor.

In response to detecting a particular user requesting to download the main page, step 170 provides that data corresponding to the identification is retrieved. This data may include the network location (e.g. URL, or partial URL) to the node or directory element where the collection or set of pages of interest are made accessible. The data may also include categories or headings on the main page that are associated with the collection or set of pages of interest. Thus, the user may send a request for the main page to the network site, and receive in turn the main page, along with programming and data that will be used to display information about a collection or set of pages that are of interest to that user.

In an embodiment, step 180 provides that the categories or headings of the main/home page may be flagged, or otherwise marked for the user, to indicate that category or heading has links or information about pages that are of interest to that user. For example, an arrow may be provided in front of a category identifier to indicate that the displayed category carries data and information about sets or collection of pages of interest (see e.g. static feature 322 in FIGS. 3A and 3B). The marking or identification of the category or heading may be static on the page, meaning it the marking/identification is persistent and not subject to change while the page is in a rendered state.

Step 190 provides that a dynamic or temporary presentation is created for the user on the web page. In an embodiment, the dynamic presentation is responsive to the user's attention to one or more of the topics or categories for which there are known to be associated sets of pages that are of interest to the user. In one implementation, a temporary window is flared out, or otherwise made to appear, whenever user activity indicates that the use's attention is directed to a category or topic that is associated with a set or collection of pages. In one embodiment, the user's pointer is tracked as it moves across a page. When the user's pointer crosses a category or heading that has an associated set or collection of pages, a temporary window is flared out that shows one or more links or other identifiers to the set(s) of associated pages. From the flared window, the user may select the links/identifiers. This causes a request to be generated by the user's web browser, and the request is sent to the web server.

Other forms of detecting user's attention include detecting links to categories or headings that are in a selected state, partially selected state, or near another link that is in a selected or partially selected state. For example, the user may highlight a category as a precursor to selecting it, in which case the dynamic feature of step 190 is presented to the user.

System Description

Figure 2:
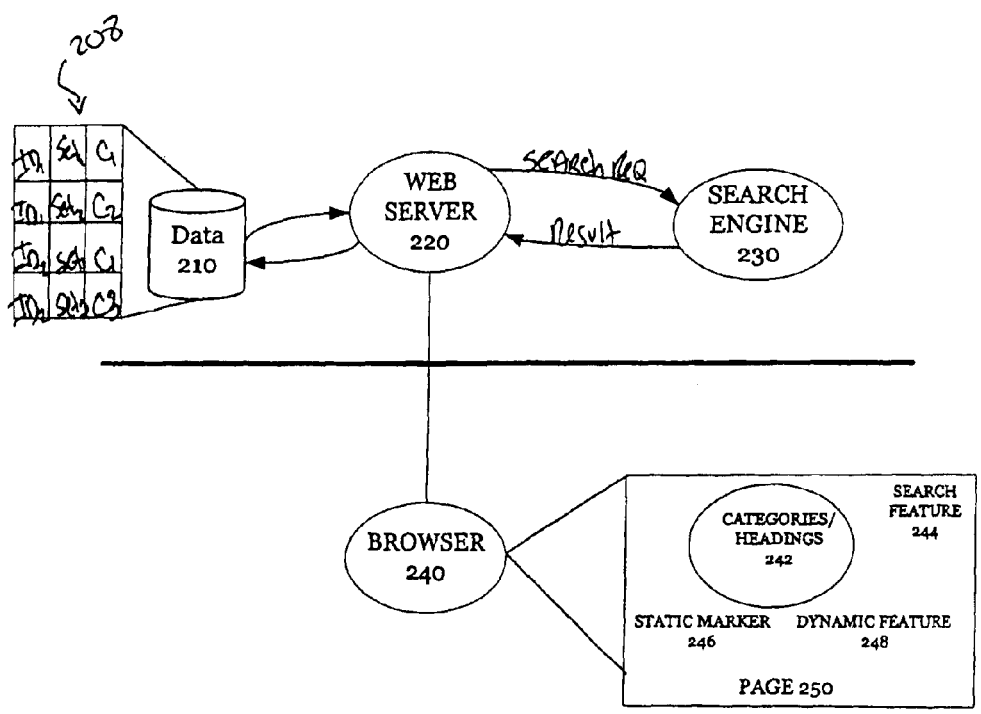
FIG. 2 illustrates a system for generating a dynamic feature to present network sites of interest to a visitor of a given network site, under an embodiment of the invention.

FIG. 2 illustrates a system, according to an embodiment of the invention. In the example provided, server side elements communicate with a client terminal to generate a web page or other network rendering in which embedded programming logic exists for generating one or more user-interface features, as described by one or more embodiments of the invention. Server-side elements include a web server 220 which communicates with a database 210, or any other memory medium for storing data. As an option, a search engine may be accessible or integrated with the functions of the web server 220. The web server 220 may host a network site and provide the web pages that are rendered by individual clients.

On the client-side, a browser 240 communicates with the web server 220 to render the pages provided by the web server. The browser 240 may use data, content and programming logic provided by the web server 220 in order to generate a page 250, based on an embodiment of the invention. As shown, the page 250 may include a plurality of categories/headings 242, a search feature 244, programming logic to create a static marker 246, and programming logic to create a dynamic feature 248.

Initially, when the client terminal accesses the network site hosted by the web server 220, the web server 220 determines an identification of the terminal (or of the user). If the identification indicates that the visitor is not known, a record is generated for the user. If the identification indicates that the visitor is known, the web server 220 may retrieve data for identifying and/or locating pages of interest to the user, as well as the categories or headers such pages of interest are to be associated with. Data and programming code for generating the web page 250 is sent to the user.

Once the identification is determined (regardless of whether the user is known or not), as the user navigates the network site, the web server 220 may monitor or observe what sub-categories or sets of pages of interest are of interest to the user. This may correspond to requests generated by the browser 240 on behalf of the user for pages that are associated with sub-category headings, or are otherwise rendered or displayed on the browser. Data determined by monitoring the web server 220 is stored in the database 210. FIG. 2 illustrates a suitable data structure 208 that is updated and used by the web server 220. The data structure 208 references the identification of the user/terminal, identified sets or collection of pages that are determined to be of interest to the user, and category/headings that are associated with the pages of interest on a particular main page (such as a home page). The data structure 208 may be updated each time a new set of collection of pages of interest are identified by the server 220.

The web server 220 may also field search requests from the client terminal. These search requests may be forwarded to the search engine 230, which then provides a response to the requests. The web server 220 may forward the response to the browser 240 of the client terminal. At the same time, the web server 220 may use the search request and/or the response to identify additional sets of pages that are of interest to the user. For example, if the user enters a search request that identifies a sub-category, the web server 220 may store data corresponding to the sub-category with the identification of the user and the associated category concurrently with the web server returning a search result to the client terminal.

For select categories and/or headings provided in the web page 250, web server 220 may embed programming logic and/or data to generate the static marker 246 and the dynamic feature 248 on the web page. The static marker 246 may correspond to a user-interface feature that does not change while a page on which it appears is in a rendered state. The static marker 246 may be placed in association with a category or heading that has associated with it a set or collection of pages. One significance of the static marker 246 may be that it informs the user that there is a dynamic feature 248. The dynamic feature is intermittent, or temporary, in that it needs to be triggered on the page in order to be seen. Once the dynamic feature 248 is in a viewable state, the dynamic feature may provide one or more links that can be selected to navigate the user to one or more sets of pages that have been determined to be of interest to that user. Thus, the static marker 246 informs the user of the presence of the dynamic feature 248.

An embodiment provides that web server 220 provides a select page, or set of pages that include programming logic and/or data for generating the static marker 246 and the dynamic feature 248. In one implementation, while numerous pages may be generated or made available by the web server 220, only a select few pages may offer the static feature 246 and the dynamic feature 248. For example, the web server 220 may provide the static marker 246 and the dynamic feature 248 on the home page, and possibly on one or more main pages that are second-tier category selections from the home page. Another implementation may provide a persistent heading or category bar that is present on many pages provided by the server 220. In such an implementation, the items in the heading or category bar may carry the static marker 246 and dynamic feature 248. Numerous other implementations are possible and contemplated herein.

User-Interfaces

Figure 3A:
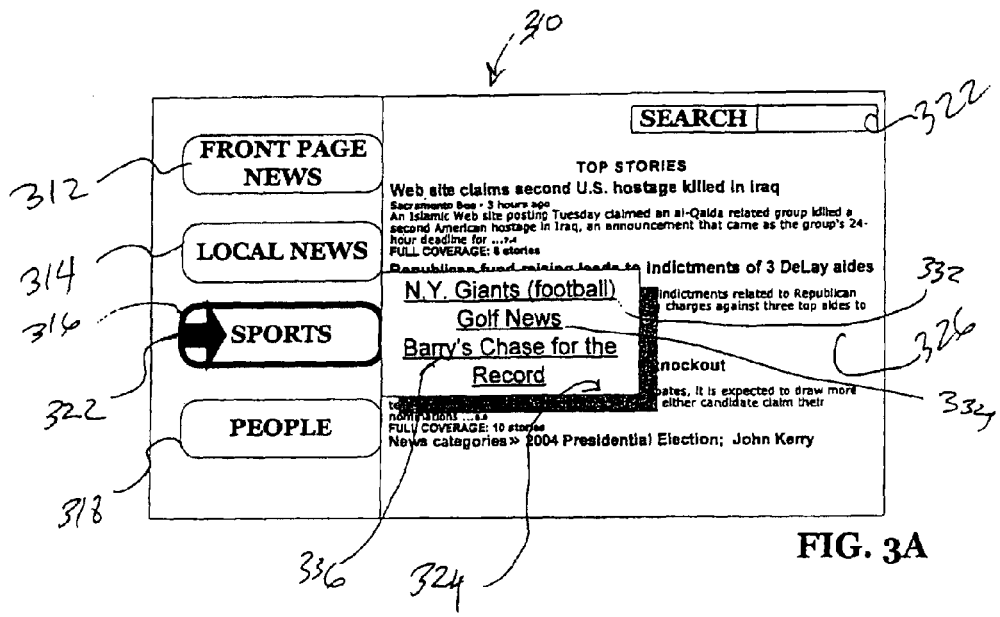
FIG. 3A and FIG. 3B illustrate the use of static and dynamic user-interface features for use with a news portal, under an embodiment of the invention.
Figure 3B:
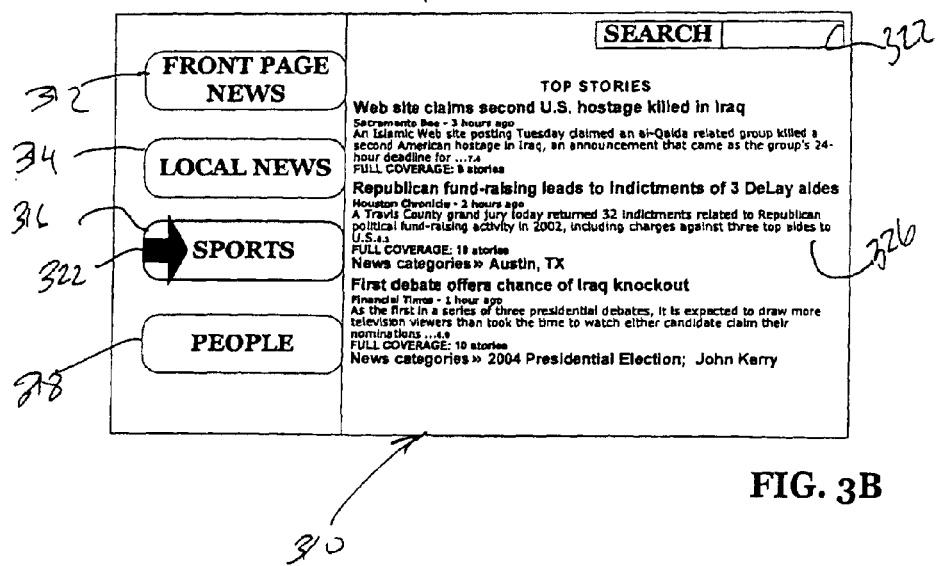

As described above, different types of user-interface features may be generated and provided on the client terminal via browser 240. FIGS. 3A and 3B illustrates a web page 310 generated by web server 220 to include a static feature 322 and a dynamic feature 324. The static feature 322 indicates the presence of the dynamic feature 324. In one embodiment, the dynamic feature 324 is hidden until an action occurs that triggers the feature to become visible. As an alternative to being hidden, the dynamic feature 324 may be dormant, minimized, or in the background of the web page 310.

FIGS. 3A and 3B is illustrated in the context of a news site or portal. FIG. 3A illustrates the dynamic feature 324 displayed over content 326 of the page 310. A listing of news category features 312, 314, 316 and 318 may be provided anywhere on the page 310. Each category feature 312-318 may correspond to a link that navigates the user to a main page where content (e.g. category-specific news stories) and links to content falling under the particular category of the feature are provided. In addition, a search feature 322 may be provided on the page 310. The submission of query into the search field 322 causes the browser 240 to send a search request to the web server 220, and then to receive results of the request from the server. The results of a search request may be presented where other content on the page are provided. The page 310 may be refreshed in order to provide the results.

The web page 310 may carry more than one of the static feature 322 and the dynamic features 324. Each static feature 322 and dynamic feature 324 may be attached to a corresponding category feature 312-318. In the example provided in FIG. 3A, the static feature is a marker attached to each category feature that has attached to it the dynamic feature. The marker is present while the page 310 is in a rendered state. In one implementation, the event that triggers the dynamic feature 324 may correspond to a pointer (e.g. mouse pointer) being moved over the portion of a display where corresponding to where the relevant category feature is provided. As an alternative or additional triggering event, the dynamic feature 324 may be triggered by a selection or pre-selection of the relevant category feature. Numerous other triggering events may be devised as needed.

FIG. 3A illustrates that when triggered, the dynamic feature 324 is viewable and provides links, with link identification information, to pages that have been determined to be of interest to the particular user. The determination may be based on past navigation, browsing and search activities of the user. The dynamic feature 324 may be made viewable in numerous ways. In one embodiment shown by FIG. 3A, the dynamic feature 324 flares out in its own window, displaying links 325 to the determined pages of interest. For example, the dynamic feature 324 may be generated through the use of Dynamic Hypertext Markup Language coding, which enables a floating window to be generated over the page 310. The dynamic feature 324 may be open and/or viewable while the trigger is ongoing (e.g. while a pointer is hovering over the relevant category feature), or until another triggering event terminates its appearance (e.g. the user clicks to another portion of the page 310. FIG. 3B illustrates how the page 310 may appear in when dynamic feature 324 is hidden. The static feature 322 may still be present, but all the viewable space on the page 310 is dedicated to providing news content.

FIGS. 3A and 3B illustrate an application in which an embodiment of the invention is provided on a news site or portal. Thus, for example, category features 312-318 may offer Front Page News, Local News, Sports and People as selectable news categories. Selection of the corresponding category feature 312-318 may cause the user to render a main category page, where for example, news stories and/or links to stories under the corresponding categories are provided. The same or different category features 312-318 may be provided on the category main page. In FIG. 3B, the static feature 322 indicates to the user that the user's previous browsing, navigation and/or search activities have identified one or more sets of pages that may be of interest to the user. In FIG. 3A, the user triggers the dynamic feature 324 (such as by moving his pointer over the category feature 316), which is a flare out carrying three links. The first link 332 (N.Y. Giants) may cause the user to navigate to a web page that is dedicated to news stories about a particular sports team. This web page may receive constant updates and real-time data (e.g. scores). A second link 334 may cause the user to navigate to a sub-category of Sports, such as Golf, which by itself may be a portal to other sites (news and non-news) about Golf. A third link 336 may cause the user to navigate to a page dedicated to tracking an ongoing sports story. Thus, the page may include news items that are updated, and include a collection of very specific news items and bibliographic information.

Figure 4A:
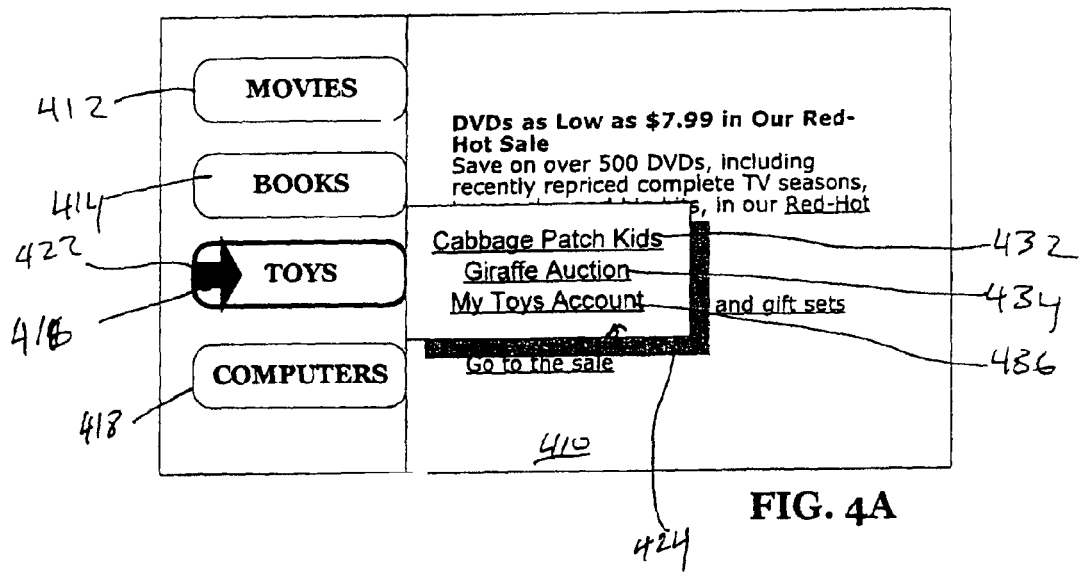
FIG. 4A and FIG. 4B illustrate the use of static and dynamic user-interface features for use with an e-commerce site, under an embodiment of the invention.
Figure 4B:
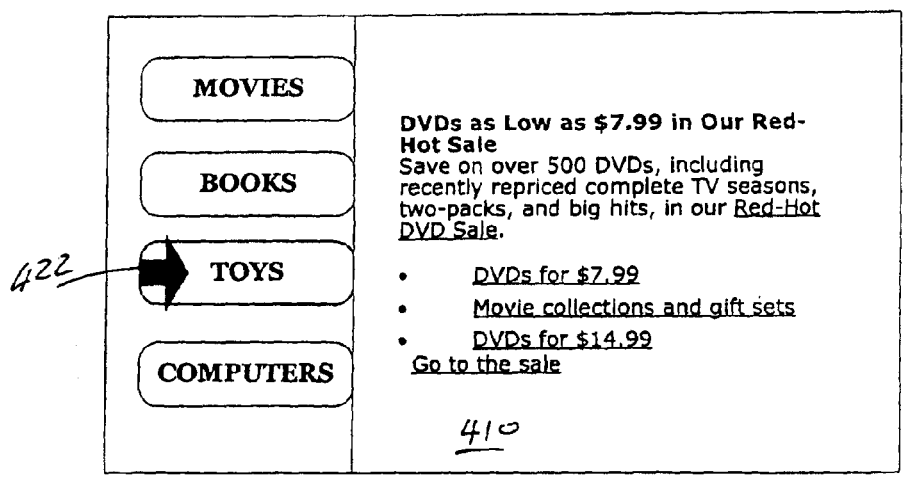

FIGS. 4A and 4B illustrate embodiments of the invention implemented in the context of an e-commerce or shopping portal. A home page 410 of the site may include listings of categories and headings that enable the user to navigate to specific sets of web pages. Category features 412-418 are provided that correspond to different kinds of goods and services offered through the site. FIGS. 4A and 4B illustrate a static feature 422 that is persistent on the page to indicate a particular category feature 416 that has pages of interest for the user. In FIG. 4A, a dynamic feature 424 is flashed across the display. The dynamic feature 424 may be flashed in response to a user's attention being directed to the category feature 416. In the embodiment shown, the dynamic feature 424 corresponds to a temporary window containing links to other network sites of interest to the user. The other network sites may be internal sites to the site of the home page 410. The dynamic feature 424 may be present as long as the user's attention is determined to be focused on the corresponding category feature 416. In one implementation, this may correspond to the duration that that the user's pointer is hovered or placed over that category feature 416.

The pages of interest may correspond to pages that the user has rendered before, or to topics and sub-categories under the feature that correspond to past searches of the user on the site. Alternatively, the pages of interest that are shown in the window of the dynamic feature 424 may correspond to pages that a user's profile or web browsing behavior indicate are of interest to the user. For example, the operator of the e-commerce portal may know that the user has purchased specific kinds of items in the past. The operator may then make suggestions to the user as to items of interest. The suggestions may be in the form of inserting links into the dynamic feature 424. In the example provided by FIG. 4A, the first link 432 may correspond to a search item, a second link 434 may correspond to a bookmarked even provided on a corresponding page (e.g. a live auction), and a third link 436 may correspond to a page that is provided specifically for the user.

Figure 5A:
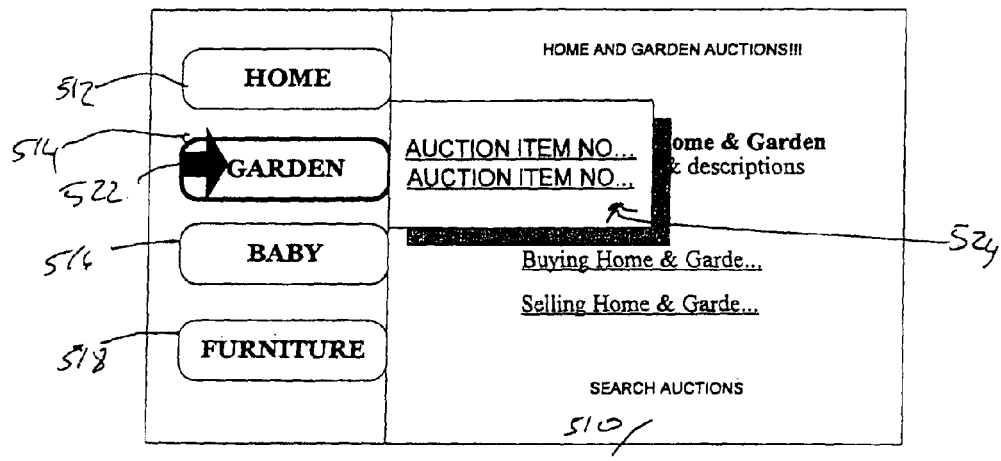
FIGS. 5A and 5B illustrate the use of static and dynamic user-interface features for use with an online auction site, under an embodiment of the invention.
Figure 5B:
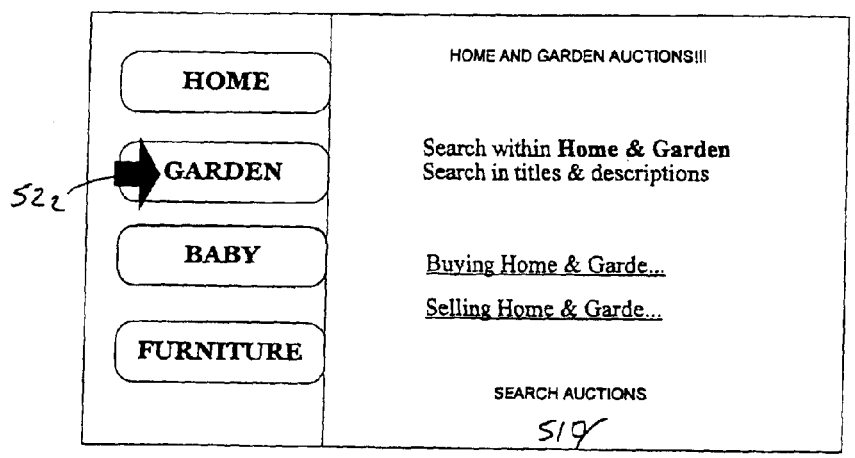

FIGS. 5A and 5B illustrate embodiments of the invention implemented in the context of an online auction site. A combination of a static feature 522 and a dynamic feature 524 may be provided on the home page 510. The dynamic feature 524 may be associated with one or more category features 512-518 that are deemed to contain items of interest for the user. In the example provided, internal sites of interest correspond to auctions that the user is participating in or has indicated a desire to monitor. The static feature 522 and the dynamic feature 524 may be provided in the category feature that belong to the auctions of interest.

Numerous other techniques can be used to determine what sites and/or pages are of interest to the user. Furthermore, the specific configurations shown in FIGS. 3A and 3B, 4A and 4B, and 5A and 5B are simplified illustrations. Numerous variations exist to aspects and characteristics of the display, including the placement and orientation of the features, and the manner that the dynamic feature is provided on the page. Furthermore, while the dynamic feature in the embodiments described above are all shown as a flared or temporary window, other types of dynamic features may be used. The dynamic features described above may even be persistent, similar to the static features described.

With regard to embodiments, links provided in each dynamic portion (or flare out) may be ordered or prioritized in a number of ways. For example, listed links may be prioritized by user-preference, or by most recent additions being added to the top of the list. Additionally, one or more embodiments contemplate other user-interface features that enable removal of a link in one of the dynamic portions. For example, a button or icon may be provided next to each link, and upon its selection, the particular link can be removed from the dynamic portion or flare out.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computer implemented method for providing a user of a network site one or more links of interest, the method comprising:
    recording one or more pages of the network site that the user selects to view during one or more past instances;
    associating at least one of the one or more pages to one of a heading or a category that is displayed on the network site;
    providing a marking with the one of the heading or the category to signify the at least one of the one or more pages that are associated with the one of the heading or the category, wherein the marking includes at least one of a static or dynamic feature;
    at a current instance, detecting a user-activity that indicates the user's attention is directed to the one of the heading or the category on a displayed page of the network site;
    in response to detecting the user-activity, generating a feature that provides a link to the at least one page that is associated with the one of the heading or the category.

2. The method of claim 1, wherein the step of detecting a user-activity includes detecting the user moving a pointer across a region of any display generated by the network site, wherein the region includes the one of the heading or the category.

3. The method of claim 2, wherein the step of generating a feature includes flashing a temporary window that contains a link to the at least one page.

4. The method of claim 3, wherein the step of flashing a temporary window includes displaying information about the link in the window.

5. The method of claim 1, further comprising the step of generating a static feature with the heading or category that indicates an availability of the temporary window.

6. The method of claim 1, wherein the step of associating at least one of the one or more pages with the one of the heading or category includes determining a category of each of the one or more pages.

7. The method of claim 1, wherein the step of recording one or more pages includes recording one or more pages that comprise a result to a search query entered by the user on the network site.

8. A computer implemented method for providing one or more links of interest to a user of a network site, the method comprising:
    observing one or more navigation actions of the user from a first page at one more past instances;
    determining one or more links of interest based on the one or more navigation actions of the user;
    associating the one or more links of interest with one of a plurality of headings on the first page;
    providing a marking with the one of the plurality of headings on the first page, to distinguish the one of the plurality of headings over one or more other headings in the plurality of headings, wherein the marking includes at least one of a static or dynamic feature;
    at a current instance, detecting a user-activity that indicates the visitor's attention is directed to the one of the plurality of headings on the first page of the network site; and
    in response to detecting the user-activity, generating a feature that provides the one or more links of interest.

9. The method of claim 8, wherein the step of generating a feature is performed in a proximity to the one of the plurality of headings.

10. The method of claim 8, wherein the step of observing one or more navigation actions of the user include recording at least one of a search request made through the first page or a search result provided on the first page, and wherein the step of determining one or more links of interest is performed using the at least one of the search request and the search result.

11. The method of claim 9, wherein the step of generating a feature includes flashing a temporary window that contains a link to the at least one page.

12. The method of claim 11, wherein the step of flashing a temporary window includes displaying information about the link in the window.

13. The method of claim 8, further comprising the step of generating a static feature to indicate a presence of the feature.

14. The method of claim 13, wherein the step of generating the static feature includes marking the one of the plurality of headings apart from the other of the plurality of headings.

15. The method of claim 8, wherein the step of observing one or more navigation actions includes recording links to one or more sites that the user requests to render in the past instances.

16. The method of claim 15, wherein the step of associating the one or more links of interest to the one of the plurality of headings includes determining a sub-category for the one or more links of interest based on one or more categories provided by the plurality of headings on the first page.

17. The method of claim 8, wherein the step of generating a feature includes generating a moving window that includes the one or more links of interest.

18. The method of claim 8, wherein the step of generating a dynamic feature includes generating a transparent feature that includes the one or more links of interest.

19. The method of claim 8, wherein the step of detecting a user-activity includes detecting a position of a user's pointer on the first page.

20. A computer implemented method for providing one or more links of interest to a user of a network site, the method comprising:
 providing a network site that enables viewing of any one of a plurality of internal network pages, wherein each of the plurality of network pages is associated with a category;
 displaying a plurality of categories on at least a first page of the network site;
 at a first instance when a given user visits the network site, recording the given user's selection to view content provided from one or more of the plurality of pages;
 determining a category of content provided at the one or more of the plurality of pages; and
 at a subsequent instance the given user visits the network site:
 identifying the given user's selection at the first instance,
 providing a marking with the determined category, to distinguish the determined category from one or more other categories, wherein the marking includes at least one of a static or dynamic feature; and
 displaying a feature with one of the plurality of categories that is associated with the determined category;
 wherein displaying the feature includes providing a link with the feature to a page that includes the content associated with the determined category at the subsequent instance.

21. The method of claim 20, wherein providing a link with the feature to a page that includes the content associated with the determined category includes providing the link to the one or more pages of the given user's selection at the first instance.

22. The method of claim 20, wherein displaying a feature with one of the plurality of categories includes displaying the plurality of categories on a main page hosted on the network site.

23. The method of claim 20, wherein providing a network site that enables viewing of any one of a plurality of internal network pages includes enabling any user to browse a main page of the network site and to select any one of the plurality of categories to view one or more pages that include content associated with the category of the selected one of the plurality of categories.

* * * * *